United States Patent [19]

Bühler et al.

[11] Patent Number: 4,903,213
[45] Date of Patent: Feb. 20, 1990

[54] NUMERICAL CONTROL SYSTEM FOR HIGHLY DYNAMIC PROCESSES

[75] Inventors: Ernst Bühler, Losone; Marco Boccadoro, Verscio, both of Switzerland

[73] Assignee: AG für Industrielle Elektronik Agie, Losone, Switzerland

[21] Appl. No.: 126,267

[22] Filed: Nov. 30, 1987

[30] Foreign Application Priority Data

Dec. 1, 1986 [DE] Fed. Rep. of Germany ....... 3640987

[51] Int. Cl.$^4$ .................... G06F 15/46; G05B 19/403; B23H 7/06
[52] U.S. Cl. ................................. 364/474.31; 318/573
[58] Field of Search ................... 364/474.31, 182, 702, 364/723, 853; 318/573

[56] References Cited

U.S. PATENT DOCUMENTS

| | | | |
|---|---|---|---|
| 3,538,315 | 11/1970 | Reuteler | 364/474.31 |
| 3,720,814 | 3/1973 | Klein | 364/474.31 |
| 4,034,192 | 7/1977 | Kishi et al. | 364/474.31 |
| 4,704,688 | 11/1987 | Kamata | 364/474.31 |

Primary Examiner—Allen MacDonald
Attorney, Agent, or Firm—Helfgott & Karas

[57] ABSTRACT

A numerical control system performs path interpolation calculations for the control of highly dynamic processes having different path contour geometries wherein a vector having a length L connects in linear form a first point P1 to a second point P2. These points are located in three dimensional Cartesian space having axes x, y, and z. Length L has Cartesian components X, Y and Z and is subject to an angular rotation C about the z axis. The system also has process parameters S and K wherein S is an address identifying the parameter to be modified and K identifies the modified parameter value. A coarse interpolator outputs the path elements L, X, Y, Z and C and the parameters S and K between path increments as course interpolations which are a function of the path contour geometry but are independent of time frame. A fine interpolator having an intermediate memory is connected downstream from the course interpolator. The fine interpolator outputs the path elements and parameters as fine interpolations. The intermediate memory receives, for intermediate storage and subsequent processing, the course interpolations from the course interpolator. There is no joint fixed grid frame for data exchange between the two interpolators. Control means operates in time independence from the coarse interpolator and controls the fine interpolator with its memory to perform the fine interpolation steps and the outputting of parameters S and K in real time.

24 Claims, 5 Drawing Sheets

NUMERICAL CONTROL SYSTEM FOR HIGHLY DYNAMIC PROCESSES

CROSS REFERENCE TO CO-PENDING APPLICATION

The present application is related to co-pending application Ser. No. 126,568 filed on even date herewith.

BACKGROUND OF THE INVENTION

The present invention relates to a numerical control system for highly dynamic processes.

In particular, the present invention relates to a numerical control system for performing a path interpolation for the control of highly dynamic processes, such as for spark erosive metal machining and laser machining. A numerical control system of the type is known from the book "Rechnersteuerungen von Fertigungseinrichtungen", by R. Nann, ISW 4, Springer-Verlag, Berlin, Heidelberg, New York, 1972, pp 113–123. In the known control system, a coarse interpolator operates in a fixed time grid, a linear fine interpolator connected downstream of the coarse interpolator is operated in the same time grid. Data exchange between the coarse interpolator and the fine interpolator also takes place within this time grid at predetermined time intervals. When a path interpolation is required for slightly curved contours, the performance of the coarse interpolation and the fine interpolation in a common fixed time frame leads to an unnecessarily small node spacing, and an unnecessary data flood is produced. As a result, the coarse interpolator has to perform unnecessary calculations. Another problem resulting from the interpolation in the fixed time grid occurs when calculating the last nodes at the end of the path calculated by interpolation, if a specific end point of the path is to be reached. Conventionally the last path element has a length differing from that of the preceding path elements, so that the path end point can only be reached in the fixed time grid through a speed jump.

The book "Interpolation in numerischen Bahnsteuerungen" by D. Binder, ISW 24, Springer-Verlag, Berlin, 1979, pp 60–113 describes and compares various interpolation processes, which are also bound to a fixed time grid. Pages 113 and 114 of this book disclose a linear fine interpolator working according to the "Pulse-Rate-Multiply" process. However, such a fine interpolator does not permit rearward interpolation. Another disadvantage of this fine interpolator is that fine interpolation can only be performed over the entire range of the interpolator.

SUMMARY OF THE INVENTION

It is a primary object of the present invention to provide a new and improved numerical control system wherein the data quantity necessary for path interpolation is reduced and an increase in the interpolation speed is achieved.

A numerical control system, in accordance with the principles of the invention, performs path interpolation calculations for the control of highly dynamic processes having different path contour geometries wherein a vector having a length L connects in linear form a first point P1 to a second point P2. These points are located in three dimensional Cartesian space having axes x, y and z. Length L has Cartesian components X, Y and Z and is subject to an angular rotation C about the z axis. The system also has process parameters S and K wherein S is an address identifying the parameter to be modified and K identifies the modified parameter value.

The system utilizes a coarse interpolator for outputting the path elements L, X, Y, Z, and C and the parameters S and K between path increments as course interpolations which are a function of the path contour geometry but are independent of time grid.

The system also utilizes a fine interpolator having an intermediate memory and connected downstream from the course interpolator. The fine interpolator outputs the path elements and parameters as fine interpolations. The intermediate memory receives, for intermediate storage and subsequent processing, the coarse interpolations from the course interpolator. There is no joint fixed time grid for data exchange between the two interpolators.

The system also utilizes control means which operates in time independence from the coarse interpolator and controls the fine interpolator with its memory to perform the fine interpolation steps and the outputting of parameters S and K in real time.

The inventive numerical control system operates in time grid-independent manner and consequently performs a geometry-dependent, adaptive control, where only a minimum data quantity is produced, so that dead times are largely avoided. A speed required by the servosystem is precisely respected in the case of the inventive control system by the geometry-dependent calculation. Apart from forward interpolation, the inventive control system also permits a rearward interpolation.

The inventive control system permits the control of highly dynamic processes in real time with all the information necessary for the control. Thus, the control system permits very high path speeds with a high path resolution. A master computer, which is used as a coarse interpolator, is subject to minimum loading and is consequently available for other tasks.

The inventive numerical control system makes it possible to perform laser cutting at a speed of 10 m/min in the case of 1 micrometer path increments. In the case of spark erosive machining, the numerical control system according to the present invention obtains a machining speed of 1 m/min in the case of 100 nm path increments.

Significant advantages are also obtained with the inventive control system through the possible modularity resulting from the decoupled independent operation of the fine interpolator with respect to the coarse interpolator.

The real time output of process parameters synchronized with the geometry permits a higher power and precision in many processes.

The foregoing as well as additional objects and advantages of the invention will either be explained or will become apparent to those skilled in the art when this specification is read in conjunction with the brief description of the drawings and the detailed description of preferred embodiments which follow.

DETAILED DESCRIPTION OF PREFERRED EMBODIMENTS

Figure 1:
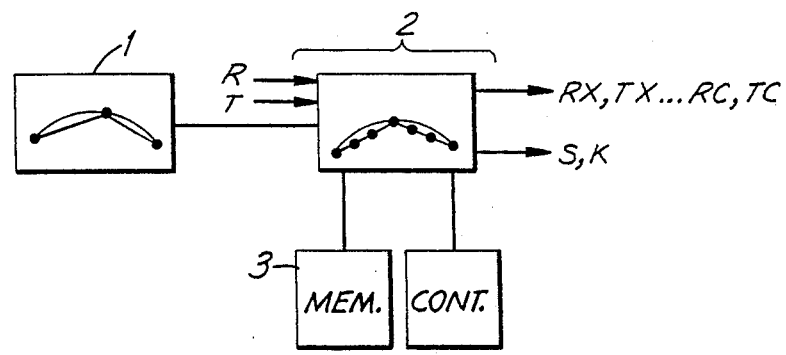
FIG. 1 is a block diagram of a numerical control system.

FIG. 1 shows the two main components of the system, namely the coarse interpolator 1 which reduces the geometry to the linear portions and transfers said reduced geometry together with further control information to the fine interpolator 2 and the fine interpolator 2, which can in turn report back information concerning the system status, process status or the geometrical points reached on the fine interpolator 2.

Fine interpolator 2 contains an intermediate store 3, which stores in ordered manner the information from the coarse interpolator 1. This intermediate store 3 is normally equipped with random access memories (RAM).

The store capacity can readily be up to 1 Mbyte, i.e. one million 8 bit data words. The smallest construction has approximately 2 Kbyte and would be asynchronously reloaded from the coarse interpolator 1 in the case of long programs with the process running and after reporting back. This process can naturally also be performed batchwise forwards and backwards, so that it is always possible to interpolate back to the starting point.

The fine interpolator 2 also contains an autonomous control system 4, which essentially comprises a sequential control. The latter is activated by different control signals and, as a function of status signals, performs one of several preprogrammed control sequences. As a result of the latter, the fine interpolator receives one byte from the coarse interpolator 1, stores same at the address of the intermediate store 3 incremented by 1 and acknowledges the acceptance to the coarse interpolator 1. When the servo-path grid clock signal T requires a new path increment, as a function of the servo-direction signal R a control sequence for forward or backward interpolation is activated. The sequence speed can be so high that microseconds following the servo path grid clock signal T or even earlier, the axial outputs RX, TX, RY, TY, RZ, TZ, RC, TC have the correct path increments.

It is also possible to output process parameters S, K between two path increments. They can be stored at this point of the geometry in intermediate store 3, or can be outputted by the coarse interpolator 1 as a direct, manual command, which in turn triggers a corresponding control sequence. Process parameters S, K comprise an address S, which states which parameter of the system or process is to be modified, and a value K, which corresponds to the new setting of said parameter. Thus, without great wiring expenditure it is possible to control all the parameters via one bus and in each case one address decoder, which in the case of coincidence assumes the value K in a register.

Figure 2:
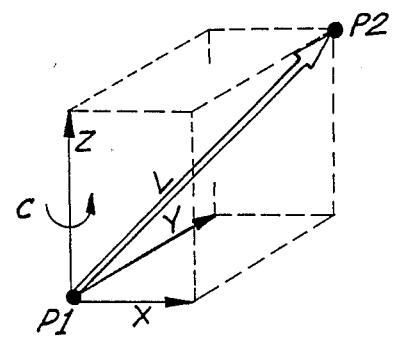
FIG. 2 is a representation of a four-axis spatial movement

FIG. 2 shows an example of a four-axis controlled countersinking erosion machine in three-dimensional form, the path elements L, X, Y, Z, C as outputted by the coarse interpolator 1. A vector of length L connects in linear form space point P1 with space point P2 and, as explained hereinafter, never differs by more than one admissible path error E from the desired path.

This vector length L is subsequently the reference for the summation of the servo-path grid clock signals, so that a vector true speed of the system is guaranteed. The Cartesian axial components X, Y and Z, as well as the components for the rotation C about the Z-axis are also transferred to the fine interpolator and subsequently determine the division ratio in a programmable frequency divider 5. The number and nature of the axes can differ greatly from process to process. Thus, apart from the three principal axes X, Y, Z, spark-erosive wire cutting machines also have conical axes U and V. In addition, modern laser cutting machines have at least five axes, in order to be able to orient in an optimum manner the laser beam onto preshaped sheet metal parts.

Modern, inexpensive personal computers can rapidly and precisely perform mathematical floating point operations, provided that angle functions are not required (e.g. sine, cosine or tangent). However, there are also digital signal processors and one chip floating point processors, which satisfy all requirements regarding the calculating speed of the basic operation. Thus, in 100 ns, new chips are able to perform a 32 bit floating point addition or multiplication. In the case of double precision (11 bit exponent, 52 bit mantissa) a floating point processor is able to perform all the basic operations and square roots in less than 8 $\mu$s, whilst e.g. a tangent function requires 30 $\mu$s.

Since many processors also have no angle functions in the instruction set, a coarse interpolator not requiring these functions is very advantageous.

Figure 3:
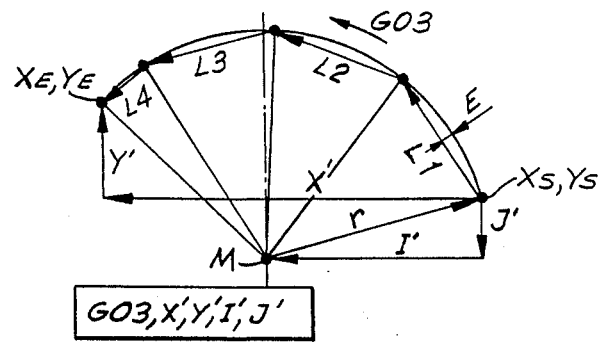
FIG. 3 is a representation of a circular coarse interpolation.
Figure 4:
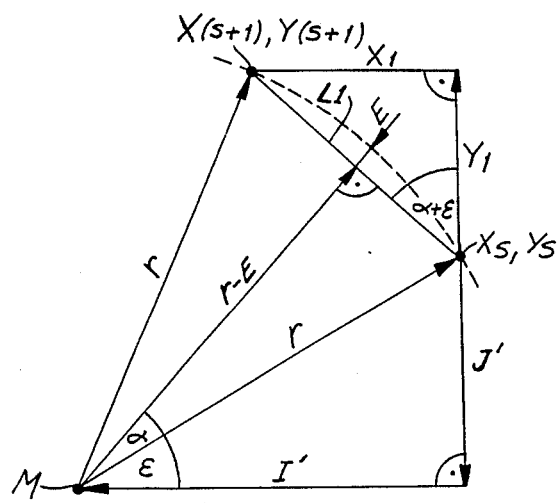
FIG. 4 is a representation for illustrating the calculation of the path error and the axial components for the circular coarse interpolation.

FIGS. 3 and 4 illustrate the principle of the coarse interpolation without angle functions. A circular piece is to be moved counterclockwise. Information is available e.g. according to DIN 66025 in ISO code, G03 meaning circular interpolation in the counterclockwise direction, X', Y' are the difference distances between the starting coordinates $X_S$, $Y_S$ and end coordinates $X_E$, $Y_E$, whilst I', and J' are the difference distances between the starting coordinates $X_S$, $Y_S$ and the center of the circle M. Angle $\epsilon$ is enclosed by the X-axis and the connecting line between the center of the circle M—starting coordinates $X_S$, $Y_S$. Angle $\alpha$ is enclosed by said connecting line and the perpendicular from center of circle M onto vector $L_1$.

In order that the fine interpolator 2 only has to interpolate linearly and only a minimum data quantity is produced, it is necessary to find a polygonal course $L_1$ ... $L_4$, which never differs by more than one error value E from a maximum of one admissible value with respect to the theoretical circle. This admissible error can e.g. be 1 $\mu$m, or e.g. for destruction portions where accuracy plays no part, can be much greater. For ease of understanding, vector notation is not used hereinafter. part, can be much greater. For ease of understanding, vector notation is not used hereinafter.

The following procedure is adopted:

1. The radius of the circle (r) is determined:

$$r = \sqrt{I^*I + J^*J}$$

2. Over the right-angled triangle using angle α (in FIG. 4) it is possible to determine the maximum chord length L for a given error E:

$$L_1 = 2^* \sqrt{r^*r - (r - E)^*(r - E)}$$

3. With the aid of a stored table for the admissible values of L, which will be explained hereinafter, it is possible to select the next smaller, integral value of vector length L. As the vectors $L_1 \ldots L_3$ are all of equal length, the aforementioned calculations only have to be performed once per geometrical set.
4. As the angle sum in triangles is always 180°, it is possible to prove that the angle between $L_1$ and $Y_1$ corresponds to the sum of $\alpha + \epsilon$. Thus $X_1 = L_1^* \sin(\alpha + \epsilon)$ and $Y_1 = L_1^* \cos(\alpha + \epsilon)$. After goniometric transformation
$\sin(\alpha + \epsilon) = \sin\epsilon^* \cos\alpha + \cos\epsilon^* \sin\alpha$, and
$\cos(\alpha + \epsilon) = \cos\epsilon^* \cos\alpha - \sin\epsilon^* \sin\alpha$.
From FIG. 4 it follows that:
$\sin\alpha = L_1/(2^*r)$, $\cos\alpha = 1 - E/r$
$\sin\epsilon = J'/r$ $\cos\epsilon = I'/r$.

Thus, the angle functions are eliminated and the sought axial components $X_1$ and $Y_1$ can be obtained as follows:
$X_1 = L_1(J'/r^*(1 - E/r) + I'/r^*L_1/(2^*r))$
$Y_1 = L_1(I'/r^*(1 - E/r) - J'/r^*L_1/(2^*r))$
Thus, only J' and I' are variables, whereas the residue per geometrical set is constant and only has to be calculated once, hence:

$$X_1 = J'^*K_1 + I'^*K_2 \quad K_1 = L_1^*(1 - E/r)/r$$
$$Y_1 = I'^*K_1 - J'^*K_2 \quad K_2 = L_1^*L_1/(2^*r^*r)$$

5. Possible old rounding errors are now added to $X_1$ and $Y_1$ and the result is rounded off to an integer. The new rounding error is stored.
6. The first path elements $L_1$, $X_1$, $Y_1$ can be outputted to the fine interpolator 2.
7. The new difference distances to the end coordinates $X_E$ and $Y_E$ are calculated:

$$X \text{ axis} = X' - X_1 \quad Y \text{ axis} = Y' - Y_1$$

and also the new circle center distance:

$$I'_1 = I' - X_1, J'_1 = J' - Y_1.$$

8. The procedure according to 4 to 7 is now repeated until the end coordinates $X_E$, $Y_E$ can be obtained with a last vector length L admissible according to the table. In FIG. 3 this is e.g. $L_4$. Thus, at the most vector $L_4$ can be of the same length as $L_1$. If the table of admissible vector lengths L permits no direct jump, then the vector $L_4$ can be formed from two or more path elements L, X and Y. Various errors can be compensated with this terminal vector $L_4$, e.g. the last rounding error, the finite calculating precision of the processor used and the often disturbing overdetermination of the end coordinates $X_E$, $Y_E$ by the ISO code.

Figure 5:
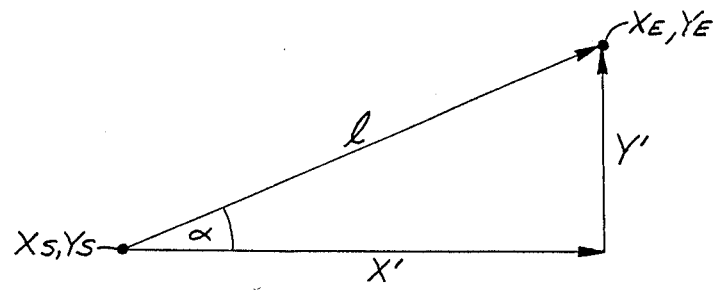
FIG. 5 is a representation of a linear coarse interpolation.
Figure 6:
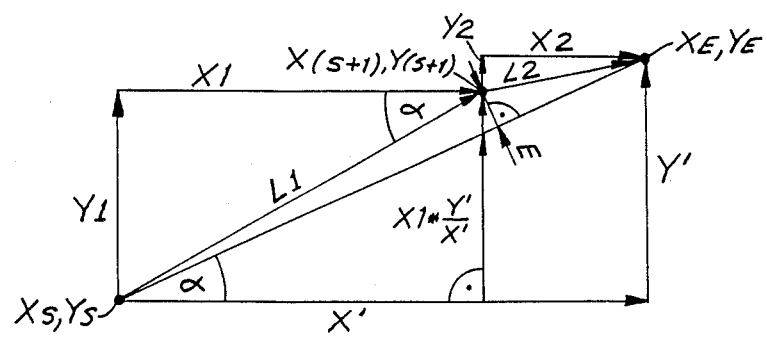
FIG. 6 is a representation for illustrating the calculation of the path error and the axial components for the linear coarse interpolation.

The calculating methods for linear coarse interpolation are shown by FIGS. 5 and 6. In the ISO code, G01 stands for linear interpolation. X' and Y' are once again the difference distances between the starting coordinates $X_S$, $Y_S$ and the end coordinates $X_E$ and $Y_E$.

Linear interpolation is a special case in that frequently geometrical sets occur which only relate to one axis. Through the limited valency of the fine interpolator 2 (cf. also D. Binder, p 114), it is appropriate to add a multiplication factor N to the path elements L, X, Y, Z, C, which determines how often a path element L, X, Y, Z, C is to be performed in fine interpolator 2, which leads to a further drastic reduction of the data quantity.

Assuming that in the X-direction it is necessary to interpolate 127,000 mm with a speed of only 10 mm/min and path increments of 1 μm, in the fixed time frame principle of 20 ms, a traditional coarse interpolator would produce a data flood of 38,100 path elements L,X,Y,Z,C, but with the proposed principle this can be dealt with by a single path element set N*L, X,Y, Z, C, if the fine interpolator is of the 7-digit type.

In the case of polyaxial movement and a small admissible path error E, the gain is admittedly smaller than in the above example, but because the data quantity is only geometry-dependent, the computer loading is always much smaller.

In FIG. 5, the theoretically required linear path is designated 1 and with X' includes the angle of inclination α. Thus, tangent α is Y'/X', cosine α is X'/β and sine of α is Y'/β.

FIG. 6 shows how the theoretical path 1 can be performed with e.g. two sets of path elements $L_1$, $X_1$, $Y_1$ and $L_2$, $X_2$, $Y_2$, the path error E being formed at right angles to the theoretical path 1. Thus, with a maximum $L_1$, the algorithm attempts to come close to end coordinates $X_E$, $Y_E$. From the outset only the vector lengths L admissible according to the stored table are used. The axial components $X_1$, $Y_1$ can then be calculated and can be rounded off to integral amounts fitting into the path frame. One obtains $X_1 = L_1^*X'/\beta$ and $Y_1 = L_1^*Y'/\beta$. It is finally necessary to clarify whether the path error E produced is smaller or equal to the admissible value, whereby $E = (Y_1 - X_1^*Y'/X')^*Y'/\beta$. If path error (E) is too large, the entire calculation is repeated with the next smaller admissible vector length L, otherwise the first path elements $L_1$, $X_1$ and $Y_2$ are outputted to the fine interpolator 2.

The new mass difference to the end coordinates $X_E$, $Y_E$ is now calculated: X-axis = $X' - X_1$ and Y-axis = $Y' - Y_1$ and the procedure is adopted until the mass difference becomes zero. The rounding errors and calculation residuals are automatically eliminated.

Figure 7:
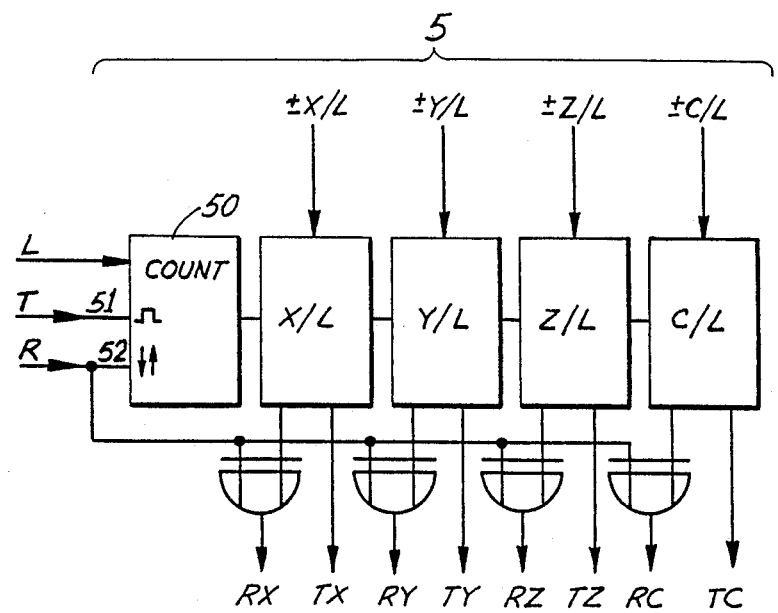
FIG. 7 is a circuit of a programmable frequency divider of a fine interpolator.

FIG. 7 is an embodiment of a programmable frequency divider 5 of fine interpolator 2. The circuit can be designed with conventional logic components or in gate array technology. In principle, the function is the same as in the circuit according to D. Binder, pp 73 and 114, with the difference that the programmable frequency divider 5 can divide without error all admissible vector lengths L in all possible division ratios and forward and backward interpolation is possible. To achieve this, a counter 50 is provided, which can be programmed to a starting value equal to the vector length L, receives via clock input 51 the servo-path frame clock signals T and in accordance with the servo-direction signal R, by means of direction input 52 increments or decrements the counter content. Axial component registers X/L, Y/L, Z/L and C/L contain the axial components X, Y, Z, and C, which are normally divided by an optimized value by the coarse interpolator 1 and rounded off. For a seven-digit fine interpolator 2, this value is equal to the vector length L divided by 128, 127.97 to 128.01 giving equally good results. This constant 128 can be determined experimentally or by a computer simulation. The optimum value is that which gives the largest number of admissible vector lengths L and which for no axial component combination X, Y, Z, C produce a final error caused by rounding. If e.g. for the X-axis, 80 path increments were calculated by coarse interpolator 1, then subsequently precisely 80 must be outputted by the fine interpolator 2 to the axial output TX. For the aforementioned example, there are 43 admissible vector lengths and the following table to be stored in the coarse interpolator is obtained:

---

1 to 10 without gap and then
12,14,15,16,17,18,20,24,28,30,31,32,33,34,36,40,48,56,60,62, 63,64,65,66,68,72,80,96,112,120,124,126,127.

---

Following a brief analysis of these values, it can be seen that each vector length L between 1 and 127 can be combined from a maximum of 2 partial vectors.

The axial component registers X/L, Y/L, Z/L and C/L also contain an additional bit, which states in which direction axial components X, Y, Z and C are to act. This bit is connected via exclusive-OR gates to the servo-direction signal R and accordingly gives the movement directions RX, RY, RZ, and RC. The generation of clock signals takes place in the same way as described by D. Binder on pp 72 and 73 of the aforementioned book and during rearward interpolation the falling edges or sides of the outputs of counter 50 are detected and AND-connected with the axial component register content.

The following assembler listing describes an algorithm for a 8051 processor, which is able to perform the fine interpolation shown in FIG. 7. However, in this embodiment 42 machine cycles are necessary for a path increment output, which in the worst case leads to a dead time of 54 s for a new segment transfer. This time is quite acceptable for normal requirements, but is too slow by a factor of 10 for high speed systems. Therefore for such applications preference should be given to the discrete solution or optionally to a mixed variant.

```
FINE INTERPOLATION WITH AT LEAST 4 AXES
(PART OF INTERRUPT SERVICE ROUTINE IN RESPONSE
TO A SERVO STEP PULSE)
MACHINE:     8051 INTEL MICROCONTROLLER AT 12MHz
LANGUAGE:    8051 MACRO ASSEMBLER
DESCRIPTION OF USED VARIABLES
SFWD         = servo direction, 1 = forward, 0 = backward
LVECTOR      = vector sum of x,y,z,c interpolation segments + 1
LCTR         = counter of vector L
LCTR_OLD     = LCTR value one step ago
X            = X segment (bits in reverse order)
Y            = Y segment (bits in reverse order)
Z            = Z segment (bits in reverse order)
C_SEGM       = C segment (bits in reverse order)
DIR_COMMAND  = byte containing the directions of axes
DIRBYTE      = dir pattern for output port to hardware
STEPBYTE     = steps pattern for output port to hardware
STEPX        = flag to output a step on X ax (same for Y,Z,C)

Bidirectional interpolation within a segment
                                        ; NUMBER OF MICROSEC PER INSTRUCTION
          CODE                          v
                                        v
                                        v
          JB    SFWD, INT_FORW          ; 2 SKIP IF STEP FORWARD
          HERE BACKWARD
          MOV   A,DIR_COMMAND           ; 1
          CPL   A                       ; 1
          MOV   DIRBYTE,A               ; 1 COMPLEMENT DIRECTIONS IF BACKW
          DJNZ  LCTR,IB1                ; 1 IF SEGMENT FINISHED, LOAD NEW SEGM
          JMP   GET NEWSEG              ; 1 GET NEW SEGMENT
IB1:      MOV   A,LCTR OLD              ; 1
          XRL   A,LCTR                  ; 1 GIVES BITS THAT CHANGED
          MOV   B,A                     ; 1 SAVE TEMP
          MOV   A,LCTR                  ; 1
          CPL   A                       ; 1
          AHL   A,B                     ; 1 GIVES BITS THAT CHANGED FROM 1 TO 0
          MOV   B,A                     ; 1
B HOLDS A PATTERN THAT, IF ANDed WITH X,Y,Z,C,SEGM
CONTROLS THE STEP EXECUTION,I.E. WICH AX AND WHEN HAS TO
OUTPUT A STEP
THERE IS NO LIMITATION FOR THE NUMBER OF AXES
          DISIR STEPS:
                ANL   A,X               ; 1 STEP ON X AX ?
                JZ    NOX               ; 2 NO
                SETB  STEPX             ; 1 YES, SET FLAG
NOX:            MOV   A,B               ; 1 RESTORE PATTERN
                AHL   A,Y               ; 1 STEP ON Y AX ?
                JZ    NOY               ; 2 NO
```

-continued

|  | SETB | STEPY | ; 1 YES, SET FLAG |
| --- | --- | --- | --- |
| NOY: | MOV | A,B | ; 1 RESTORE PATTERN |
|  | ANL | A,Z | ; 1 STEP ON 2 AX ? |
|  | JZ | NOZ | ; 2 NO |
|  | SETB | STEPZ | ; 1 YES, SET FLAG |
| NOZ: | MOV | A,B | ; 1 RESTORE PATTERN |
|  | ANL | A,C SEGH | ; 1 STEP ON C AX ? |
|  | JZ | NOC | ; 2 NO |
|  | SETB | STEPC | ; 1 YES, SET FLAG |
| NOC: |  |  |  |
|  | HERE INSERT MORE AXES OUTPUT STEPS |  |  |
|  | MOV | P1.STEPBYTE | ; 2 OUTPUT STEPS TO PORT 1 |
|  | MOV | P2.DIRBYTE | ; 2 OUTPUT DIRECTIONS |
|  | CLR | STEPBYTE | ; 1 RESET FLAGS STEPX, STEPY, ... |
|  | MOV | LCTR_OLD,LCTR | ; 2 UPDATE COUNTER MEMORY |
|  | JMP | INT1_END | ; 2 EXIT, TOTAL TIME 42 MICROSEC |
|  |  |  | ; PLUS 12 MICROSEC TO LOAD A NEW |
|  |  |  | ; SEGMENT |
| INT FORW: |  |  |  |
|  | HERE STEPS FORWARD |  |  |
|  | MOV | A,DIR_COMMAND | ; 1 |
|  | MOV | DIRBYTE.A | ; 1 SET DIRECTION AS PROGRAMMED |
|  | INC | LCTR | ; 1 INCREMENT COUNTER |
|  | CJNE | LCTR.LVECTOR.IB2 | ; 2 IF SEGMENT FINISHED, LOAD NEW SEGM |
|  | JMP | GET_NEWSEG | ; 12 GET NEW SEGM |
| IB2: | MOV | A,LCTR OLD | ; 1 |
|  | XRL | A,LCTR | ; 1 GIVES BITS THAT CHANGED |
|  | ANL | A,LCTR | ; 1 GIVES THAT CHANGED FROM 0 TO 1 |
|  | MOV | B,A | ; 1 SAVE PATTERN |
|  | JMP | DISTR_STEPS | ; 2 SAME INSTR AS FOR BACKWARD STEPS |

Figure 8:
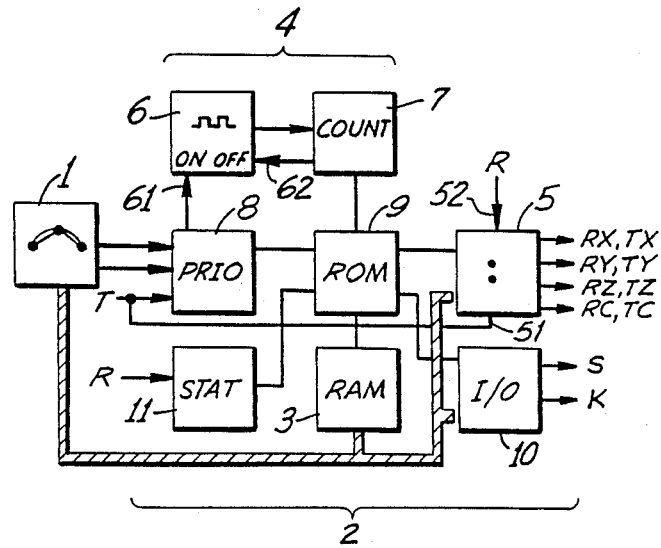
FIG. 8 is a block diagram of the fine interpolator.

INT1 END:

FIG. 8 shows the block circuit diagram of fine interpolator 2. Coarse interpolator 1 transmits control signals to priority detector 8, a data bus passes to the intermediate store 3, programmable frequency divider 5 and process parameter output circuit 10. Priority decoder 8 also receives the servo-path frame clock signals T, which must obviously be processed with maximum priority. The other priorities are dependent on the system and process and must be fixed in each individual case. Following the activation of an input of priority decoder 8, oscillator 6 is released across its starting input 61 and then program counter 7 is incremented with a frequency of e.g. 30 MHz. On reaching the maximum reading of counter 7, oscillator 6 is stopped again by means of stop input 62. The purpose of this measure is that firstly there is no need to wait for synchronization with a free-running oscillator and secondly the power dissipation of the system is kept low despite the high frequency.

The outputs of program counter 7 are connected to first address inputs of the fixed programmed program memory 9, second address inputs are connected to the priority decoder 8 and third address inputs are connected to a status register 11. Thus, e.g. four different program sequences can be initialized in each case four different variants to in each case 15 program steps. For example, status register 11 contains information as to whether the servo-direction signal R requires forward or backward interpolation, whether counter 50 off the programmable frequency divider 5 is in overflow or underflow position, etc. The function of status register 11 is to ensure the performance of the correct variant (e.g. forward or backward interpolation) of a program.

The data outputs of the fixed programmed program memory 9 mainly control and coordinate the output of axial outputs RX, TX, RY, TY, RZ, TZ, RC, TC of the programmable frequency divider 5, the output of process parameters S, K of the process parameter output circuit 10 and the reading and writing of intermediate memory 3.

Intermediate memory 3 can have an 8 bit wide organization, or in the case of corresponding speed requirements can e.g. have a 48 bit width, whereof 5 times 8 bits describe the path elements L, X, Y, Z and C and the direction thereof, 2 bits determine the multiplication factor N, 5 bits are used for parity checking purposes and 1 bit states whether the address contains geometry information or process parameter information. The organization of the intermediate memory 3 must be fixed according to the requirements of the process, order to achieve the best speed in the case of optimum operating reliability and most favorable costs.

Figure 9:
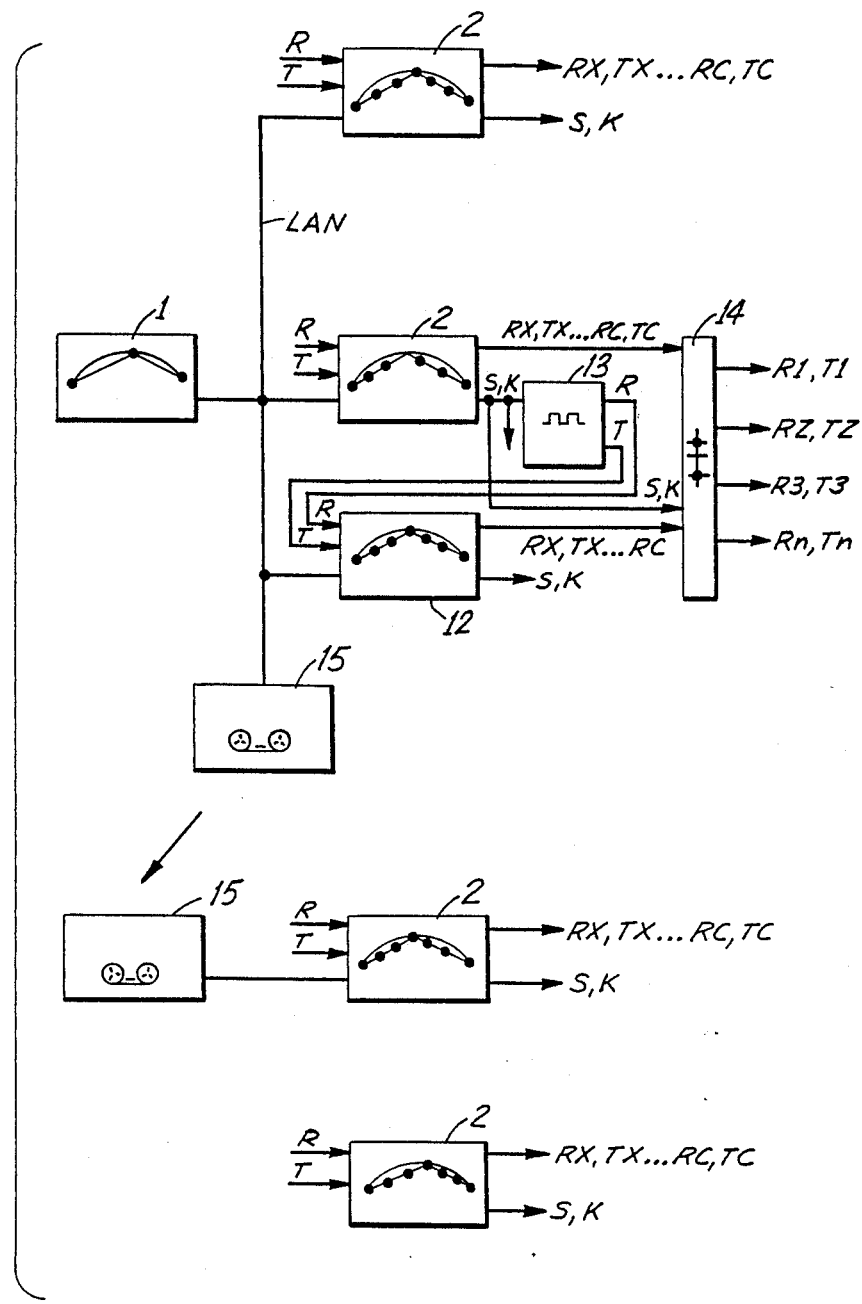
FIG. 9 is a block circuit for a control for four possible processes.

FIG. 9 illustrates a production complex, which comprises four different processes. Process 1 is a simple, 4-axially controlled countersinking erosion machine, process 2 a highly complex cutting-countersinking erosion plant with electrode changer, supply units and handling robots, process 3 is a laser cutting plant and process 4 is a high pressure water jet cutting plant for production purposes. This scenario is intended to show how adaptable and extendable the proposed control system is.

Thus, for example, a single powerful coarse interpolator 1 can be used for the direct control of processes 1 and 2. In addition and if necessary, a non-volatile memory medium 15 can be loaded with the necessary data in order to perform the independent process 3, which provides for no message back to the coarse interpolator 1. Finally, process 4 is so-to-speak programmed for life and in large runs always produces the same parts. Fine interpolator 2 of process 4 is advantageously provided with an intermediate memory 3, which stores the information in non-volatile manner. This can be achieved in that the supply of the RAM components is buffered with a battery or use is made of electrically programmable and optionally erasable ROM memory components.

In the case of process 3, the information flow takes place by means of a magnetic tape, cassette or floppy disk, whilst processes 1 and 2 can be performed bidirectionally via a local data network. Such data networks are conventionally built up with coaxial cables or fiber optics lines. It is important that there is an adequate transmission capacity, so that there is no bottleneck for the data flow at this point.

Process 2 is of particular interest, because a highly complex problem is solved with simple means. Normally charging or feeding robots and supply units for production means are equipped with their own numerical controls, which are subordinate to the process. During the process sequence these numerical controls are condemned to doing nothing. Using the present invention a very great improvement to the utilization of the numerical control system is possible, in that the same fine interpolator 2 is used for controlling the cutting erosion process, the countersinking erosion process, a charging robot and a supply unit. For this purpose, only one switching matrix 14 is required in order to divert the axial outputs RX, TX, RY, TY, RZ, TZ, RC, TC correctly to the cutting process, countersinking process, robots or supply unit. Processes producing no servo-signals can be performed at the path speed by means of a controllable oscillator 13. Once again the control of switching matrix 14 and controllable oscillator 13 takes place by means of process parameters S, K. The slave fine interpolator 12 is constructed in the same way as the master fine interpolator 2 and need only be present if time-controlled drive shafts are to be operated. The capital cost savings are obvious, because a single numerical control system is sufficient for running several processes in multiplex operation.

Additional information concerning operation of the course interpolator is contained in the aforementioned copending application and is incorporated by reference herein.

While the invention has been described with detailed reference to the drawings, it will be obvious to those skilled in the art that many modifications and changes can be made within the scope and sphere of the invention as defined in the claims which follow.

What is claimed is:

1. A numerical control system for performing path interpolation calculations for the control of highly dynamic processes having different path contour geometries wherein a vector having a length L connects in linear form a first point P1 to a second point P2, said first and second points being located in three dimensional Cartesian space having axes x, y, and z, length L having Cartesian components X, Y and Z and being subject to an angular rotation C about the z axis, the system also having process parameters S and K wherein S is an address identifying the parameter to be modified and K identifies the modified parameter, said system comprising:
   a coarse interpolator means for performing coarse interpolations of and outputting path elements L, X, Y, Z and C and the parameters S and K between path increments wherein said course interpolations are a function of the path contour geometry but are independent of a time grid;
   a master fine interpolator means for performing fine interpolations of said path elements and parameters and including an intermediate memory and being connected downstream from the course interpolator means and receiving, intermediately storing, subsequently processing the coarse interpolations from said coarse interpolator means, and outputting said path elements and parameters as fine interpolations, wherein there is no joint fixed grid frame for data exchange between the coarse interpolator means and the fine interpolator means; and
   control means operating in time independence from the coarse interpolator means for controlling the fine interpolator means so that said memory thereof performs fine interpolation steps and the outputting of parameters S and K in real time.

2. The system of claim 1 wherein the coarse interpolator means is a programmable computer.

3. The system of claim 2 wherein the coarse interpolator means is a personal computer programmable in a known language.

4. The system of claim 3 wherein the computer is constructed so that is does not use angle functions and employs floating point arithmetic.

5. The system of claim 4 wherein the computer has a digital single chip floating point signal processor.

6. The system of claim 1 wherein the coarse interpolator means includes means for calculating the path elements in such manner that only such vector lengths L are allowed which ensure that a maximum deviation of a vector length from the contour to be interpolated does not exceed a predetermined value.

7. The system of claim 6 wherein the coarse interpolator means is constructed so that when calculating the path elements (L, X, Y, Z, C) only those vector lengths (L) are allowed which in the fine interpolator means will not produce for any vector position a final error in the components (X, Y, Z, C) and wherein admissible vector lengths (L) are determined with the aid of a mathematical simulation or a test run of said fine interpolator means and are stored in a table form in said coarse interpolator means.

8. The system of claim 7 wherein the coarse interpolator means is constructed in such a way that when calculating the path elements (L, X, Y, Z, C) it takes account of rounding errors occuring during a quantization necessary for the fine interpolator means when calculating the path elements (L, X, Y, Z, C) and checks prior to each calculation of the path elements (L, X, Y, Z, C) whether a path end point can be reached with a permitted vector length (L) and in this case selects a final component (X, Y, Z, C) in such a way that a final error is reduced to zero.

9. The system of claim 8 wherein the coarse interpolator means is constructed so that it multiplies the calculated path elements (L, X, Y, Z, C) by a numerical factor (N) indicating how often the fine interpolator means successively interpolates a vector length (L).

10. The system of claim 1 wherein the fine interpolator means includes at least one programmable frequency divider which has a pulse rate multiplier with a counter, axial component registers (X/L, Y/L, Z/L, C/L) and an exclusive-OR circuit, in which
   (a) the counter has:
      (a.1) an input which is programmed to a starting value equal to a determined vector length (L),
      (a.2) a clock input for a servo-path frame clock signal (T),
      (a.3) a direction input for a servo-direction signal (R), and (a.4) an output connected to said axial component registers, and (b) each of the axial component registers (X/L, Y/L, Z/L, C/L) has an input for an additional direction information and an axial output (TX, TY, TZ, TC), and (c) the exclusive OR circuit has a plurality of gates equal in number to the number of said registers, each gate being responsive at one input thereof to the servo-direction signal (R) and another input thereof to the associated axial component register (X/L, Y/L, Z/L, C/L) and consequently determines movement directions (RX, RY, RZ, RC, TC) of axial outputs (RX, TX, RY, RZ, TZ, RC, TC) of said frequency divider.

11. The system of claim 10, wherein said control means is a time independent control system which has a priority decoder and is designed in such a way that (a) it only operates when (a.1) said coarse interpolator means loads a data word into said intermediate memory, or (a.2) said coarse interpolator means directly introduces a manual control into a process, or (a.3) a servo-path frame clock signal (T) is to be processed, and (b) in the case of a simultaneous application of several signals, said priority decoder determines a hierarchy of said signals.

12. The system of claim 11 wherein the fine interpolator means includes at least one fixed-programmable sequential logic component and at least one array logic component.

13. The system of claim 12, wherein the fine interpolator means is constructed from hard-wired logic, and further comprises a fixed programmed program memory coupled to said priority decoder, a status register coupled to said program memory, said intermediate memory being connected to said program memory, at least one programmable frequency divider connected to said program memory, a process parameter output circuit also connected to said program memory and a counter connected to said program memory and acting as a program counter, and an oscillator connected to the counter and being responsive to the priority decoder and having a starting input connected to said priority decoder and a stop input connected to said program counter.

14. The system of claim 13 wherein the fixed-programmed program memory is designed to activate one of several program sequences as a function of signals from the priority decoder and the status register.

15. The system of claim 14 wherein the fixed-programmed program memory is constructed so as to activate a program sequence when the servo-direction signal (R) on said counter indicates a negative direction, the data from said intermediate memory being read out and ordered in a reverse sequence and a backward fine interpolation being performed at the most back point to the starting point.

16. The system of claim 15, further including additional fine interpolators provided for a process, said additional fine interpolators being synchronized with one another by means of the servo path frame clock signal (T) and the servo-direction signal (R) on said counter.

17. The system of claim 15, and further including at least one slave fine interpolator, having a servo-path frame clock signal (T) and servo-direction signal (R) provided by a controllable oscillator, the controllable oscillator being controlled by means of the process parameters (S,K) of the master fine interpolator means.

18. The system of claim 17 wherein a switching matrix is provided which is connected downstream of the axial outputs (RX, TX, RY, TY, RZ, TZ, RC, TC) and by means of the process parameters (S, K) outputted by the fine interpolator means, said switching matrix connecting the axial outputs RX, TX, RY, TY, RZ, TZ, RC, TC) with different drive shafts ($R_1$, $T_1$, $R_2$, $T_2$, . . . $R_n$, $T_n$).

19. The system according to claim 11 wherein the fine interpolator means is substantially a programmable microcomputer which is designed in such a way that on a hierarchy basis:

(a) its algorithm, process parameters and geometrical data are loaded by the coarse interpolator means into said intermediate memory, (b) it introduces via said coarse interpolator means manually inputted instructions directly into the process, and (c) it performs a fine interpolation of servo path frame clock signals (T) and supplies said signals to the axial outputs (RX, TX, RY, TY, RZ, TZ, RC, TC).

20. The system of claim 19 wherein the intermediate memory includes a non-volatile memory medium and the intermediate memory is designed so as to store all information required by the system in order to be able to repeat a process at random.

21. The system of claim 20 wherein the non-volatile memory medium is connected between the coarse interpolator means and the fine interpolator means.

22. The system of claim 21 wherein a local data network (LAN is provided for the flow of data between the coarse interpolator means and the fine interpolator means.

23. The system of claim 22 wherein the fine interpolator means is constructed so as to feed back to the coarse interpolator means an information concerning a system state, process state and/or the geometrical points reached.

24. The system of claim 23 wherein the intermediate memory is designed to receive the process parameters (S, K) including geometry-dependent data indicative of acceleration or deceleration for a servosystem.

* * * * *